United States Patent [19]

Clark et al.

[11] 4,246,742

[45] Jan. 27, 1981

[54] DOUBLE SICKLE MECHANISM

[75] Inventors: Stanley R. Clark; Howard R. Lohrentz, both of Hesston, Kans.

[73] Assignee: Hesston Corporation, Hesston, Kans.

[21] Appl. No.: 968,341

[22] Filed: Dec. 11, 1978

[51] Int. Cl.³ ............................................. A01D 55/02
[52] U.S. Cl. ....................................... 56/259; 56/297
[58] Field of Search ............................ 56/259, 257, 297

[56] References Cited

U.S. PATENT DOCUMENTS

| 94,918 | 9/1869 | Shaw | 56/297 |
|---|---|---|---|
| 129,357 | 7/1872 | Mewes | 56/297 |
| 256,537 | 4/1882 | Bender et al. | 56/257 |
| 760,637 | 5/1904 | Maddin | 56/220 |
| 956,385 | 4/1910 | Lovett | 56/257 |
| 1,089,292 | 3/1914 | Turner et al. | 56/259 |
| 1,672,363 | 6/1928 | Brown | 56/297 |
| 3,577,716 | 5/1971 | McCarty | 56/259 |

*Primary Examiner*—Paul J. Hirsch

*Attorney, Agent, or Firm*—Schmidt, Johnson, Hovey & Williams

[57] ABSTRACT

Two sickles, each slightly longer than half the width of the swath taken by the mower, are supported across the front of the mower for reciprocation in mutually opposite directions. Although the two sickles are located in the same vertical plane, they are situated in two different horizontal planes so as to permit overlap in the center during reciprocation. To further facilitate such overlap, the backing bar to which the knife sections of one sickle are attached is located on top of the sections, while on the other sickle, the backing bar is located along the bottom of the sections. The sections are so arranged adjacent the inner ends of the sickles that even when the sickles are at the extremes of their outward strokes away from one another, no gap is presented in the center between the two innermost sections of the two sickles, thereby promoting even cutting across the entire swath taken by the sickle assembly.

3 Claims, 10 Drawing Figures

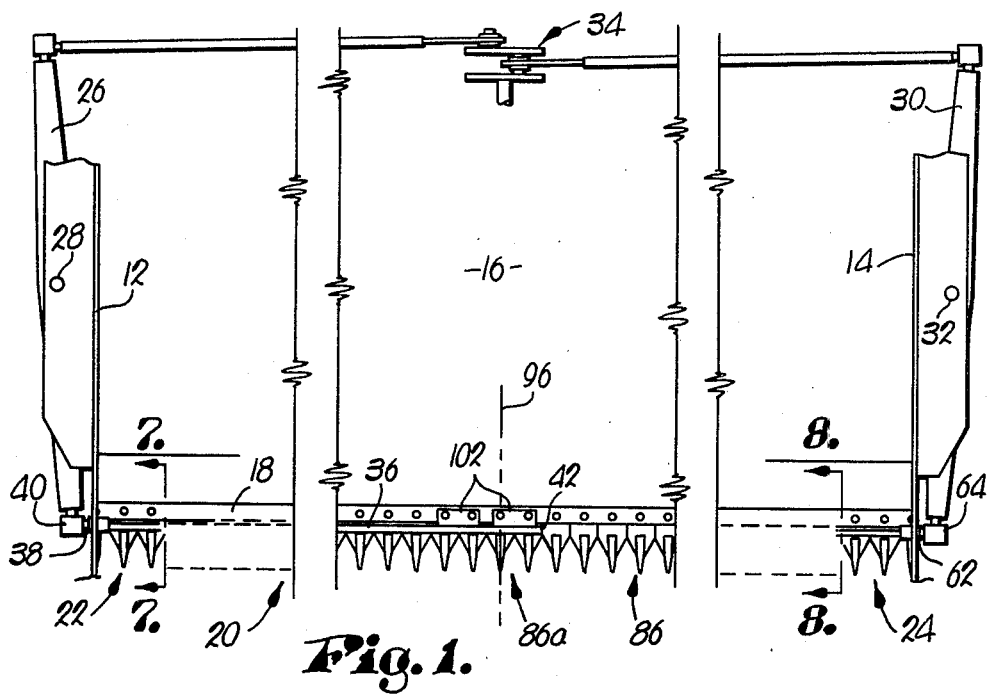
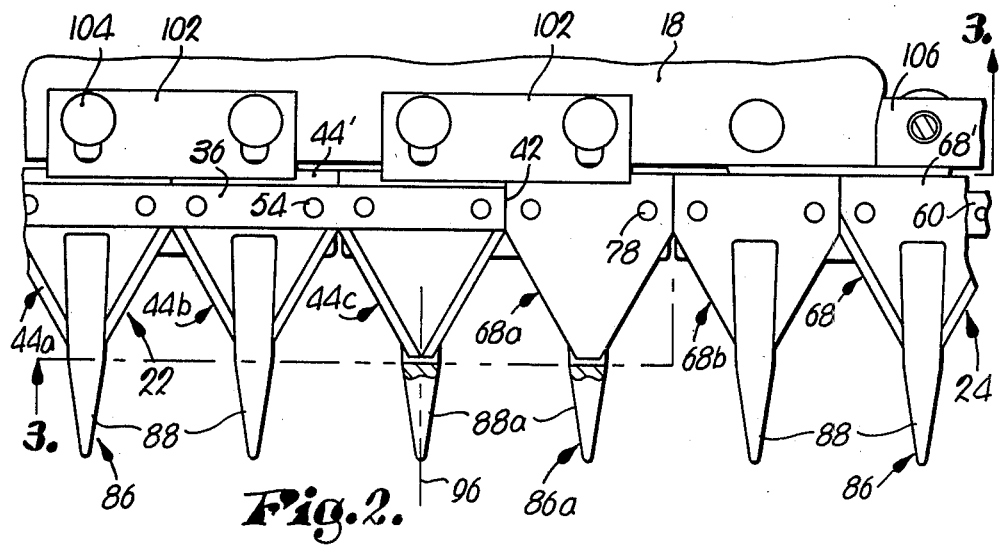
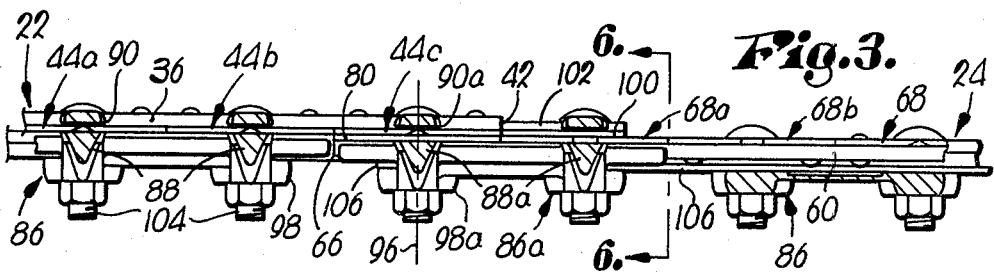

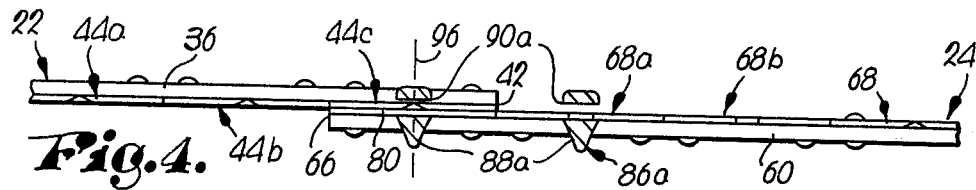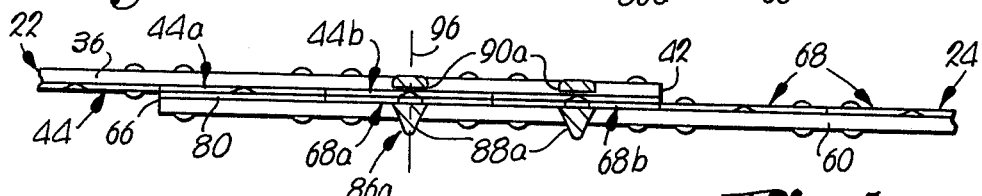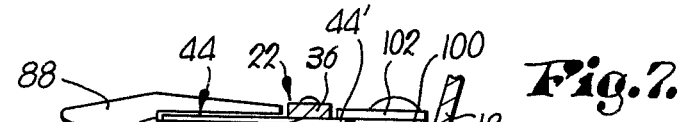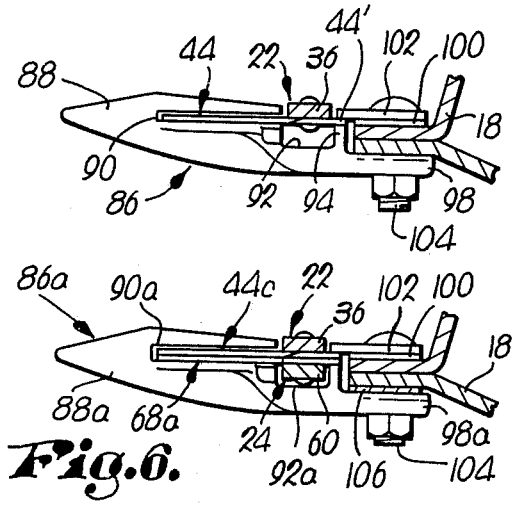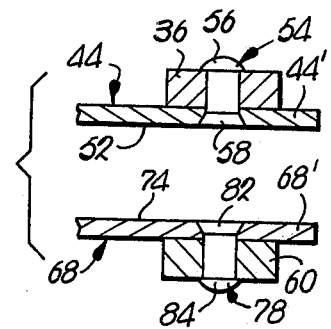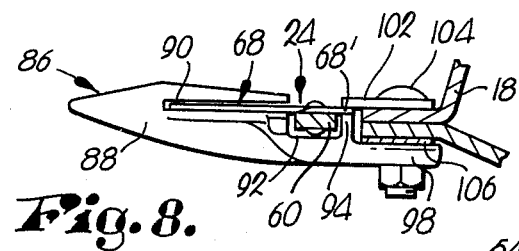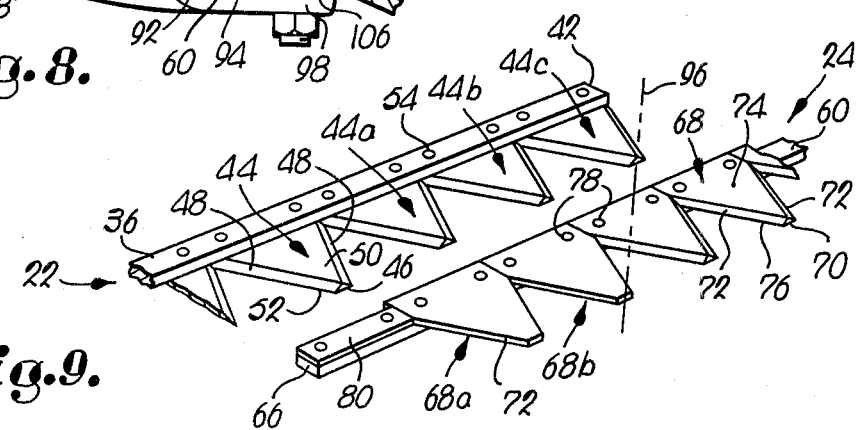

DOUBLE SICKLE MECHANISM

TECHNICAL FIELD

This invention relates to the field of harvesting and mowing equipment of the type employing reciprocating sickles.

BACKGROUND ART

Reciprocating sickles, while performing capably insofar as severing and mowing functions are concerned, give rise to vibrational problems as a result of the rapid directional changes incurred during reciprocation. The greater the mass of such sickles, the greater the vibration problems as a result of such abrupt starting and stopping action.

Thus, it has been known for many years that one way to dampen such vibrations is to have a pair of sickles on the same machine operating in mutually opposite directions so that the vibrational forces tending to be established by one of the sickles moving in one direction are counteracted by the forces generated by the other sickle moving in the other direction.

While various and sundry arrangements employing this basic principle have been utilized over the years, none has been entirely satisfactory for a number of reasons. In those assemblies in which a pair of sickles each covering about one-half the width of the header are used, there has been a problem at the center of the header where the two oppositely moving sickles come together during their inward strokes and separate during their outward strokes. In some cases, cutting in this area has been quite poor, and strips of unsevered materials have been left in the field along the center of the mower as a result of this problem.

SUMMARY OF THE INVENTION

Thus, it is an important object of the present invention to incorporate the vibration-dampening attributes of a double sickle assembly yet to eliminate and avoid a compromise of the mowing quality obtainable with such an arrangement, particularly the quality adjacent the center of the mower.

In order to achieve the foregoing object, the two sickles of the assembly, each of which is slightly longer than one-half the width of the swath taken by the mower, are inverted relative to one another such that the backing bar on which the knife sections of one sickle are mounted is placed along the top of such knife sections, while the backing bar of the other sickle is located along the bottom of its knife sections. Furthermore, although the two sickles are located in the same vertical plane for reciprocation across the front of the mower, they are positioned in two different horizontal planes, i.e., the sickle with the backing bar on top is raised slightly relative to the other sickle having the backing bar on the bottom. The two sickles may then readily overlap in the center without structural interference with one another, thereby assuring that a full and adequate severance of crop material in that area will be made. Overlap of the two sickles is assured not only during the inward strokes of the two sickles, but also during the outward strokes thereof.

BRIEF DESCRIPTION OF THE DRAWINGS

FIG. 1 is a fragmentary, somewhat schematic, top plan view of a mowing header employing a double sickle assembly constructed in accordance with the principles of the present invention, the two sickles of the assembly being shown at the limits of their inward strokes;

FIG. 2 is an enlarged, fragmentary plan view similar to FIG. 1 but revealing details of construction, certain components being broken away and shown in cross section for clarity, the two sickles being shown at the limits of their outward strokes;

FIG. 3 is a fragmentary, cross-sectional view of the assembly taken substantially along line 3—3 of FIG. 2;

FIG. 4 is a schematic front view of the assembly with most of the guards removed for clarity and showing the relationship of the two sickles when they are at the outermost limits of their outward strokes;

FIG. 5 is a view of the assembly similar to FIG. 4 but with the two sickles shown at the innermost limits of their inward strokes;

FIG. 6 is a fragmentary, cross-sectional view of the sickle assembly taken substantially along line 6—6 of FIG. 3 to show the overlapping relationship of the sickles adjacent the center of the mower;

FIG. 7 is an enlarged, fragmentary, cross-sectional view of the assembly taken substantially along line 7—7 of FIG. 1;

FIG. 8 is an enlarged, fragmentary, cross-sectional view of the assembly taken substantially along line 8—8 of FIG. 1;

FIG. 9 is an enlarged, fragmentary, exploded view of the overlapping sickles in perspective showing certain details of construction; and FIG. 10 is an enlarged, vertical cross-sectional view of the two sickles adjacent the overlapping portion thereof and showing the riveting construction in that area.

DETAILED DESCRIPTION

The mower 10 shown fragmentarily in FIG. 1 includes opposite sideframe members 12 and 14, a platform 16 extending between said members 12 and 14, and a support across the front thereof commonly referred to as the "cutter bar" 18. As is apparent, the cutter bar 18 extends transversely of the path of intended forward travel of the mower 10.

A sickle assembly 20 is carried by the cutter bar 18 across the front of the mower 10 for severing standing crop materials as the mower 10 is advanced. As will hereinafter be described in detail, the assembly 12 includes a pair of oppositely reciprocating sickles 22 and 24, the sickle 22 being driven by a sway bar 26 pivoted at point 28 to the sideframe member 12, while the sickle 24 is driven by a sway bar 30 pivoted at point 32 to the sideframe member 14. The sway bars 26 and 30 receive input driving power from mechanism 34 at the rear of the mower 10 which in turn receives its power from a common source (not shown).

The sickle 22 includes an elongated backing bar 36 having a length just slightly greater than one-half the distance across the front of the mower 10 which defines the width of mowing swath taken by the mower. The outer end 38 of the backing bar 36 is secured via a ball-and-socket connection 40 to the forward end of the sway bar 26, and the inner end 42 of the backing bar 36 is freely disposed without any connection to any additional driving apparatus.

The sickle 22 further includes a series of generally triangular-shaped knife sections 44 extending along the backing bar 36 and projecting laterally outwardly therefrom so as to space their tips 46 at a distance forwardly beyond the forwardmost extremity of the backing bar 36. Knife edges 48 on each section 44 converge toward the tip 46, and each of the knife sections 44 is provided with a top surface 50 and a bottom surface 52 extending between said edges 48. The backing bar 36 extends across said top surface 50 of the sections 44, and the latter are firmly attached to the bar 36 by rivets 54. As shown in FIG. 10, the rivets 54 for the three innermost sections 44a, 44b and 44c have exposed, rounded heads 56 along the upper surface of the backing bar 36, but the opposite head 58 of such rivets 54 is flat, and the receiving bore therefor is countersunk so that the head 58 is flush with the bottom surface 52 of the knife sections 44. The knife edges 48 of the sections 44 are beveled along their top surfaces 50.

The sickle 24 is similar to the sickle 22 but differs in certain significant aspects. Like the sickle 22, the sickle 24 includes an elongated backing bar 60 having a length slightly greater than one-half the total length of the sickle assembly 20. The outer end 62 of the backing bar 60 is coupled via a ball-and-socket connection 64 to the forward end of the sway bar 30, while the inner end 66 (not visibile in FIG. 1 or FIG. 2 but apparent in FIGS. 3, 5 and 9) is a free end not connected to any additional driving apparatus.

A series of generally triangular knife sections 68 are attached to the backing bar 60 and extend along the latter with their forward tips 70 spaced laterally outwardly from the bar 60. Converging knife edges 72 of the sections 68 terminate at the tip 70, and top and bottom surfaces 74 and 76 respectively extend between said knife edges 72. The backing bar 60 is attached to the bottom surfaces 76 of the sections 68 by rivets 78 such that the sickle 24 is essentially inverted relative to the sickle 22.

Unlike the sickle 22, at the inner end 66 of the sickle 24 is located a plate 80 taking the place of what would otherwise be the innermost knife section 68 of the sickle 24. The plate 80 corresponds in length to the width of a section 68 at its point of attachment to the bar 60 and corresponds in width to the bar 60. The two sections 68a and 68b next adjacent the plate 80, while being of the same shape as the remaining sections 68, have straight knife edges 72 rather than the beveled knife edges 72 of the remaining sections 68. The plate 80 and the sections 68a and 68b are secured to the bar 60 with rivets 78, but such rivets 78 for these components have their upper heads 82 flat and a receiving bore therefor is countersunk such that the heads 82 are flush with the top surface 74 of the sections 68a and 68b, as well as with the top surface of the plate 80. The lower head 84 of the rivets for the plate 80 and the section 68a, 68b are rounded and exposed as are the upper and lower heads 82 and 84 of the rivets 78 for the remaining sections 68.

The sickles 22 and 24 are supported in their reciprocation by, and cooperate during severance with, means in the form of a series of so-called "guards" 86 attached to the cutter bar 18. Each of the guards 86 has a pair of tangs or points 88 that project outwardly from the cutter bar 18 and terminate at a forwardly disposed location spaced from such cutter bar 18. Each of the points 88 is provided with a horizontally extending through slot 90 that provides clearance for the knife sections 44 or 68 during reciprocation of the sickles 22, 24, and each of the guards 86 is also provided with a transversely extending, open-top channel 92 rearwardly beyond the slot 90. As illustrated in FIG. 8, the guards 86 associated with the sickle 24 have their channels 92 disposed to receive and clear the backing bar 60 during its reciprocation, while as shown in FIG. 7, the guards 86 associated with the sickle 22 do not use their channels 92 to receive the backing bar 36 inasmuch as the same is located on top of the sections 44.

Each of the guards 86 is also provided with an upstanding, transversely extending rib 94 defining the rear of the channel 92 and having an upper termination corresponding with the lower extremity of the slot 90. The knife sections 44 and 68 are so attached to their respective bars 36 and 60 that they present rear overhangs 44' and 68' respectively which, as shown best in FIGS. 7 and 8, are disposed to rest upon the corresponding ribs 94 for sliding support thereby. The remaining support for the sections 44 and 68 is obtained within the slots 90 by the lower terminations thereof such that, as is well understood by those skilled in the art, the knife edges 48 and 72 cooperate with the adjacent surfaces and edges of the slots 90 to severe the crop material.

All of the guards 86 are attached to the cutter bar 18 with their channels 92 lying in the same vertical plane. Consequently, the two sickles 22 and 24 likewise are disposed in a common vertical plane. However, the sickles 22 and 24 are disposed in different horizontal planes with the sickle 22 raised slightly relative to the sickle 24. The sections 44 of sickle 22 are located one section thickness above the sections 68 of sickle 24 and, thus, the sickles 22 and 24 may overlap at the center line 96 of the mower 10 without obstructing each other's reciprocation. As shown in FIG. 4, when the sickles 22 and 24 are at the limits of their outward strokes, they mutually overlap the width of one knife section and, conversely, when the sickles 22 and 24 are at the extremes of their inward strokes, they overlap the width of three sections. When in the condition of FIG. 4, the innermost section 44c of sickle 22 overlies the plate 80 of sickle 24 and, conversely, when the sickles 22 and 24 are in the condition of FIG. 5, the section 44a overlies the plate 80 while the section 44b overlies the section 68a and the section 44c overlies the section 68b.

The guards 86 associated with the two sickles 22 and 24 are identical to one another, although they are attached to the cutter bar 18 in such a way as to properly align their respective slots 90 for receiving their corresponding knife sections 44 or 68. Thus, as illustrated in FIG. 7, the guards 86 for the sickle 22 have lower, rearwardly extending lips 98 that slip beneath the cutter bar 18 and directly abut the latter. A shim 100 overlies the cutter bar 18 beneath a hold-down plate 102 extending substantially the entire width of the guard 86 and projecting forwardly into overlapping relationship with the overhang 44' of the knife sections 44. The cutter bar 18, the lip 98, the shim 100 and the hold-down plate 102 are all perforated at two locations so that carriage bolts 104 may be passed through such perforations such as to hold the guard 86 in place on the cutter bar 18 and to likewise properly position the hold-down plate 102. Note that the shim 100 has a thickness corresponding to the thickness of the knife sections 44 or 68.

When the lip 98 of the guards 86 for the sickle 22 is abutted directly against the lower side of the cutter bar 18, the only way that the hold-down plate 102 can be properly elevated into a high enough position to overlap the overhang 44' is by use of the shim 100 between the top surface of the cutter bar 18 and the hold-down plate 102. On the other hand, as shown in FIG. 8, since the sections 68 of the sickle 24 are disposed one section thickness below the sections 44, it is necessary that the slots 90 of the guards 86 associated with the sickle 24 likewise be disposed one section thickness lower than the guards 86 for sickle 22. Thus, no shims 100 are added to the top of the cutter bar 18 and, instead, shims 106 are added to the bottom of the cutter bar 18 between the latter and the lip 98 of the guards 86. The carriage bolts 104 pass through the hold-down plate 102, the cutter bar 18, the lower shim 106 and the lip 98 in the usual way.

While the foregoing arrangements accommodate the vertical differential between the sickles 22 and 24 along the major portions of their respective lengths, a still further accommodation needs to be made in the area of their overlap at the center line 96. It will be remembered as explained above that when the sickles 22 and 24 are at their full inward limits of reciprocation as in FIG. 5, the section 44c overlies the section 68b, and the section 44b overlies the section 68a. Hence, the two points 88a associated with the center guard 86a must have their slots 90a enlarged vertically with respect to the slots 90 of the remaining guards 86. Such enlargement as shown in FIG. 6 must be sufficient to accommodate the overlapping knife sections at that location and point of time. Moreover, inasmuch as the floor of the slot 90a needs to be down to the same level as the floor of the slot 90 in the guards 86 for sickle 24, the shim 106 is used between the lip 98a and the lower side of the cutter bar 18. However, since there is an additional section thickness to contend with along the top of the guard 86 because of the overlapping sections, a shim 100 must also be used between the top of the cutter bar 18 and the hold-down plate 102 in order to position the latter sufficiently high to overlie the rearward overhang 44' of the sections 44a, 44b and 44c during reciprocation thereof. Carriage bolts 104 are used in the same manner with the special guard 86a as with the other guards 86.

As is apparent from the foregoing detailed description, the sickles 22 and 24 reciprocate through the slots 90 of the guards 86 so as to sever the standing crop materials presented thereto. By virtue of the fact that the sickles 22 and 24 are reciprocating in mutually opposite directions at all times, the forces of abrupt acceleration and deceleration associated with one of the sickles is cancelled out by the corresponding but oppositely directed forces associated with the other of the sickles.

Because of the overlapping relationship of the sickles 22 and 24 at the center line 96, there is no mutual impediment to free reciprocation in that area. Furthermore, by virtue of the fact that the endmost section 44 of sickle 22 is immediately next adjacent the section 68a of sickle 24 when sickles 22 and 24 are at their full outward positions as illustrated in FIG. 4, there is no gap presented adjacent the center line 96 and at which crop materials could fail to be severed. In other words, that area at the center line 96 operates just as well as all other areas of the sickles 22 and 24 insofar as crop severance is concerned.

It should be further pointed out that in spite of the complete overlap for severance purposes at the center line 96, it is but necessary to have a single "special" guard 86a. In this regard, it is to be remembered that there is no knife section in the area occupied by the plate 80 of sickle 24. Hence, when sickles 22 and 24 are at their full inward extremes as illustrated in FIG. 5, although the sections 22 and 24 are overlapped the combined width of three sections, in actuality only two sets of their sections overlap, i.e., the sections 44b, 44c and 68a, 68b. The width of the third otherwise overlapping sections is occupied by the section 44a above the plate 80. Since the plate 80 is rearwardly beyond the slot 90, there is no need to enlarge the slot 90 of the particular guard 86 located to the left of the special guard 86a as viewed in FIGS. 1, 2, 3, 4 and 5.

It should further be pointed out that the special configuration of the rivets 54 and 78 as shown in FIG. 10 in connection with the sections 44a, 44b, 44c, the plate 80, the section 68a and the section 68b eliminates any hindrance to free reciprocation and overlapping of the sickles 22, 24. Furthermore, utilizing straight edges 72 on the section 68a and 68b instead of beveled edges assures that proper shearing relationship will be obtained by such sections during their reciprocation through the special guard 86a. In this regard, by having the edges 72 straight or square instead of beveled along the upper surfaces 74, the overlapping sections 44b and 44c are indeed provided with cooperating lower shear surfaces during such overlap.

We claim:

1. A double sickle assembly for use in connection with a support extending across the intended path of travel of the assembly during mowing, said assembly comprising:

a pair of elongated sickles each having a longitudinally extending backing bar and a series of knife sections mounted on said bars and projecting laterally outwardly therefrom, said sections being respectively provided with outer tips spaced outwardly from their corresponding bars and with respective pairs of knife edges that converge toward said tips, said sections further being respectively provided with top and bottom surfaces extending between said edges, said backing bar of one of said sickles being located along said top surfaces of its sections and the backing bar of the other sickle being located along the bottom surfaces of its sections;

means for attaching said sickles to the support for reciprocation along the latter in mutually opposite directions through inward and outward strokes and in a common vertical plane, said one sickle being raised with respect to said other sickle and said backing bars of the sickles being mutually overlapped during both of said strokes; and means for effecting said reciprocation of the sickles, said attaching means comprising a series of pointed guards and fastening means for securing said guards to the support with the points of the guards projecting outwardly from the support, said guards supporting the sickles during said reciprocation thereof, being provided with normally horizontally disposed clearance slots for receiving said sections during reciprocation of the latter, and cooperating with the sections in effecting severance of standing crop material, the stroke of each sickle corresponding in length to the width of one section as measured along said bars, said one sickle having at least a pair of sections adjacent an inner end thereof which are superimposed upon and in direct registration with a corresponding pair of sections adjacent an inner end of the other sickle when the sickles are at the full extent of their inward strokes such that the sections of the sickles overlap by at least two stroke lengths at said full extent of the inward strokes, said sickles when at the full extent of their outward strokes being so disposed that the cutting portion of said assembly as defined by said edges of the sections extends continuously along the entire length of the assembly without a gap adjacent the midpoint thereof whereby to avoid leaving an uncut strip of standing crop material during operation, the edges of those sections on said one sickle which are superimposed upon corresponding sections of the other sickle when the sickles are at the full extent of their inward strokes being provided with upwardly facing bevels, the edges of said corresponding sections of the other sickle being square and unbeveled to assure severing action of said corresponding sections with both their guards and the superimposed sections of said one sickle.

2. A double sickle assembly as claimed in claim 1, wherein said fastening means includes spacer means positioning the slots of the guards for said one sickle in a raised condition relative to the slots of the guards for said other sickle.

3. A double sickle assembly as claimed in claim 2, wherein the guard which receives said overlapping sections has an oversized clearance slot relative to those of the other guards which receive non-overlapping sections.

* * * * *